UNITED STATES PATENT OFFICE.

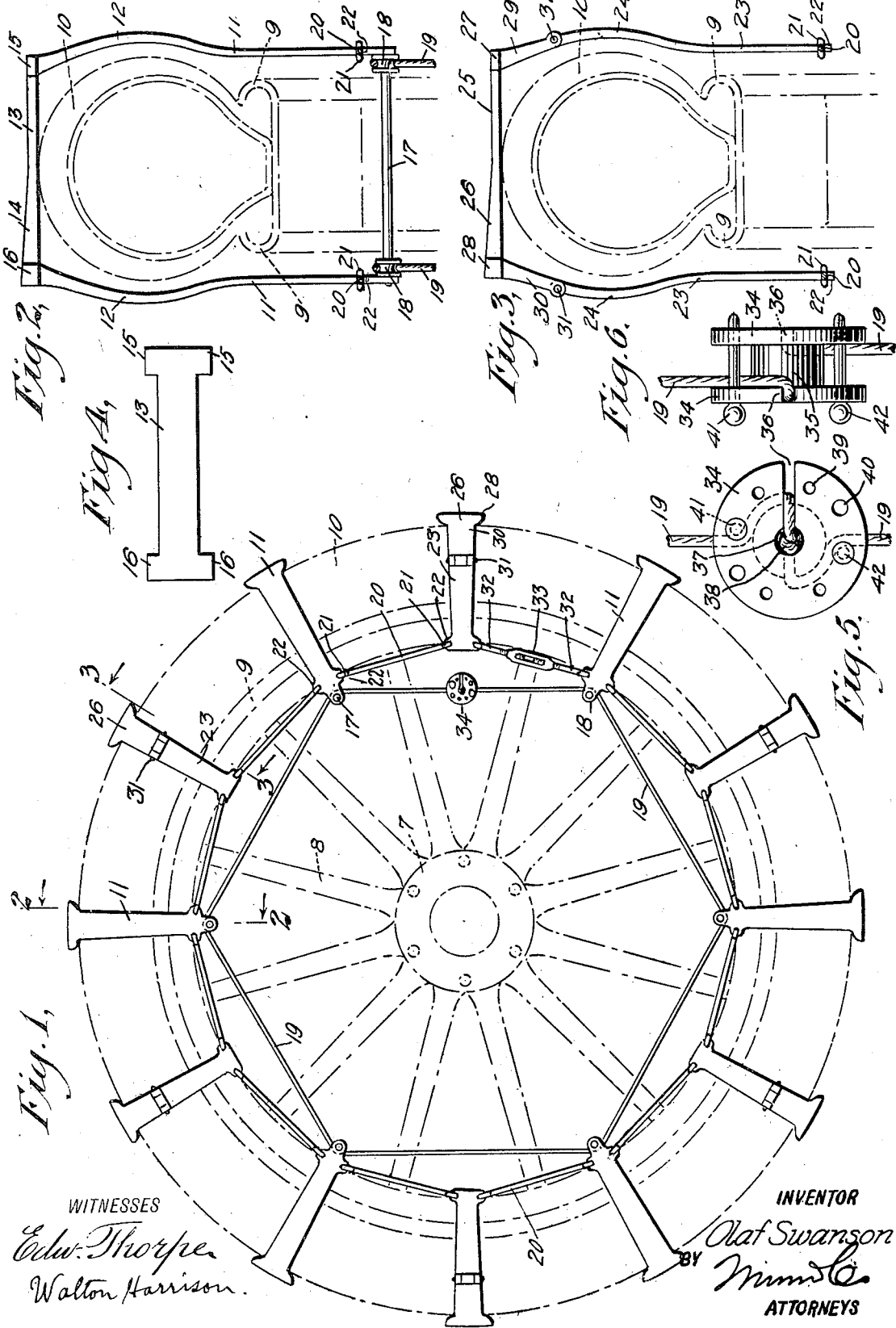

OLOF SWANSON, OF ATCHEE, COLORADO.

ANTISKID.

1,287,512.

Specification of Letters Patent.

Patented Dec. 10, 1918.

Application filed April 29, 1915. Serial No. 24,655.

*To all whom it may concern:*

Be it known that I, OLOF SWANSON, a citizen of the United States, and a resident of Atchee, in the county of Garfield and State of Colorado, have invented a new and Improved Antiskid, of which the following is a full, clear, and exact description.

My invention relates to anti-skids, used more particularly upon vehicle wheels, provided with tires and intended to keep the wheels from slipping sidewise or backward or forward.

More particularly stated, I seek to produce an anti-skid having substantially the form of a number of cuffs spaced equi-distant along the body of a pneumatic tire carried by the wheel, some of these cuffs being rigid and others being flexible, in order to maintain the tire firmly in position upon the wheel while allowing the tire to yield within proper limit.

My invention further comprehends improved forms of cuffs to be used substantially in the relation stated and means for holding the cuffs in position and for adjusting them relatively to their parts and to each other.

My invention further comprehends various improvements in anti-skid mechanism.

Reference is made to the accompanying drawings, forming a part of this specification, and in which like letters indicate like parts.

Figure 1 is a side elevation, showing my improved anti-skid applied to an automobile wheel having a pneumatic tire;

Fig. 2 is a section on the line 2—2 of Fig. 1, looking in the direction of the arrows and showing one of the rigid cuffs used to prevent skidding;

Fig. 3 is a section on the line 3—3 of Fig. 1, looking in the direction of the arrows and showing one of the flexible cuffs;

Fig. 4 is a plan view of a tread plate, forming a part of one of the cuffs and adapted to engage the ground in order to prevent skidding;

Fig. 5 is a detail view, showing in side elevation, one of the take-up devices for tightening certain cables used in connection with the cuffs; and Fig. 6 is an edge elevation of the take-up mechanism appearing in Fig. 5.

A wheel hub 7 carries spokes 8, the latter supporting a rim 9 and mounted upon this rim, is a pneumatic tire 10. Fitted upon this tire are a number of cuffs 11, each having the general form indicated in Fig. 2. The cuff as here shown is made in a single piece and is provided with curved portions 12 for accommodating the pneumatic tire and for allowing the latter to swell slightly in a direction crossing its diameter, when the tire is subjected to undue strains, such as jolts. The cuff is provided with a tread plate 13, the form of which may be understood from Fig. 4. The tread plate carries lugs 15—16, extending laterally to the general length of the tread plate. These lugs are intended to bite slightly into the ground and thus to prevent skidding in any direction. The tread plate 13 is provided with a portion 14, the thickness of which varies or tapers, being greatest adjacent the lug 16. This increased thickness is disposed adjacent the outer edge of the tire and gives one end of the tread plate 13, a slight angularity, enabling it to bite into the ground slightly, whenever there is any great tendency for the wheel to skid sidewise. Extending across the inner ends of the cuff 11 is a cross rod 17, the ends of which are provided with guides 18, and engaging these guides, are cables 19, which in this instance are made of twisted wire. The cross rods 17 are used only in connection with the cuffs 11, which, because of their construction, I designate as the rigid cuffs. Connected with the cuffs 11 are a number of bar links 20, each provided at its ends with closed hooks 21, these hooks engaging eyes 22. Pivotally connected to the links 20 are a number of cuffs 23, each having the general form shown in Fig. 3. These cuffs are provided with curved portions 24 and with tread plates 25. Each of these tread plates has a thickened portion 26 and lugs 27—28, the general form of the tread plate thus being similar to that already described with reference to Fig. 4. Connected with the tread plate 25 are two laterally extending portions 29—30 and these are by hinge pins 31, connected with the curved portions 24 of the cuff. The cuffs 23 I designate as the flexible cuffs. The curved sides 24 are free to swing slightly apart under excessive pressure of the pneumatic tire 10. Because of this feature, the tire is free to yield to a certain extent. A proper degree of firmness, however, is maintained in the tire by virtue of the rigidity of the cuffs 11. The flexible cuffs and the rigid cuffs are alternated with each other, so that both the flexibility and rigidity of the tire, as braced by the cuffs, is almost uniform throughout the circumference of the wheel.

A pair of eye bolts 32 are connected with a turn buckle 33 and also with a rigid cuff 11 and a flexible cuff 23, as shown at the right of Fig. 1. By operating the turn buckle 33, the links 20 may be placed under more or less tension and as a result, all of the cuffs are drawn radially inward, so that the tread plates 13 and 25 are forced tightly against the outer surface of the tire. There are two sets of the links 20, as will be understood from Figs. 2 and 3 and by a proper apportionment of the tension upon the links of the two sets, the cuffs may be adjusted, each angularly in relation to the general plane of the wheel, so that the tread plate rests properly upon the ground. By adjusting the turn buckles 33, therefore, the ends of the tread plates can be so positioned as to bite slightly into the ground, in order to prevent the wheel from skidding sidewise.

The cables 19 are tightened by any suitable take-up device, as for instance, by the one shown in Figs. 5 and 6. A spool 34 is provided with a reduced cylindrical portion 35 and with two slots 36 extending radially inward from opposite sides of the spool. The cable 19 is wound partially upon the cylindrical portion 35 of the spool and extends through the slots 36 and also through the axial hole 37 of the spool. A knot 38 may be conveniently concealed by being disposed within the hole 37, as indicated in Fig. 5. The spool is provided with a number of holes 39—40, each parallel with the axis of the spool. A pair of tightening pins 41—42 are inserted into the holes 39—40 and are movable from one of these holes to another. The operator by turning the spool slightly and shifting the tightening pins 41—42 each from one hole to another, can tighten or loosen the cable 19. As there are two of these cables and the tension of each can be changed independently of the tension of the other, they may be so adjusted as to slightly shift the positions of the cuffs upon the tire. Therefore, the tightening devices 34 can be caused to co-act with the turn buckles 33, in such manner as to adjust the various cuffs relatively to the tire and to cause the outer ends of the tread plates to each assume a proper angle to bite into the ground and thus prevent skidding of the wheel sidewise.

I do not limit myself to the precise construction shown, as variations may be made therefrom, without departing from the spirit of my invention.

Having thus described my invention, I claim as new and desire to secure by Letters Patent:

A device of the character described, comprising a plurality of substantially U-shaped cuffs, each provided with a surface serving as a tread plate, a cross bar connecting the inner ends of certain of said cuffs, guides mounted upon said cross bar, a flexible cable engaging said guides, and means for tightening said cable in order to fit said cuffs upon a tire.

In witness whereof I have signed my name to this specification in the presence of two subscribing witnesses.

OLOF SWANSON.

Witnesses:
 WILLIAM A. MARSH,
 SIDNEY ANN BLAIR.